(12) United States Patent
Miyagoe

(10) Patent No.: US 7,129,758 B2
(45) Date of Patent: Oct. 31, 2006

(54) LOAD DRIVING CIRCUIT WITH CURRENT DETECTION CAPABILITY

(75) Inventor: Yasuhiro Miyagoe, Kyoto (JP)

(73) Assignee: Rohm Co., Ltd. (JP)

( * ) Notice: Subject to any disclaimer, the term of this patent is extended or adjusted under 35 U.S.C. 154(b) by 109 days.

(21) Appl. No.: 10/957,048

(22) Filed: Oct. 1, 2004

(65) Prior Publication Data

US 2005/0073271 A1   Apr. 7, 2005

(30) Foreign Application Priority Data

Oct. 6, 2003   (JP)  .............................. 2003-347287

(51) Int. Cl.
*H03B 1/00*   (2006.01)
(52) U.S. Cl. ...................... 327/108; 327/110
(58) Field of Classification Search ................ 327/108, 327/112; 318/254, 439
See application file for complete search history.

(56) References Cited

U.S. PATENT DOCUMENTS

| | | | | |
|---|---|---|---|---|
| 5,264,774 A | * | 11/1993 | Ito | 318/798 |
| 5,428,281 A | * | 6/1995 | Seki et al. | 318/696 |
| 6,229,273 B1 | * | 5/2001 | Kelly et al. | 318/254 |

FOREIGN PATENT DOCUMENTS

JP   2570523   10/1996

* cited by examiner

*Primary Examiner*—My-Trang Nu Ton
(74) *Attorney, Agent, or Firm*—Cantor Colburn LLP

(57) ABSTRACT

In a load driving circuit, a detection current Is (=Io/N), 1/N of a driving current Io, flows in a detection resistor, where N indicates a shunt ratio between a current (=driving current Io) that flows in an output source (S1) and a current (=detection current Is) that flows in a detection source (S2). The shunt ratio is determined by a cell ratio between the output source (S1) and the detection source (S2).

8 Claims, 8 Drawing Sheets

LOAD DRIVING CIRCUIT WITH CURRENT DETECTION CAPABILITY

BACKGROUND ART

1. Field of the Invention

The present invention relates to a load driving circuit such as a motor driver and, more particularly, to a load driving circuit having a current detection function for detecting a driving current with a current mirror arrangement.

2. Description of the Related Art

FIG. 8 is a block diagram of a motor and a driving circuit according to the related art. FIG. 8 shows transistors Tr 801–811, a power supply voltage $V_M$, a motor 819, a current detection amplifier 821 and a detection resistor 823 for detecting a driving current Io. A dotted line in the figure indicates the driving current Io flowing through Tr 805→a V-phase driving terminal→W-phase driving terminal→Tr 811.

Referring to FIG. 8, a node C between an end of the detection resistor 823 and the transistors Tr 803–811 is connected to an inverting input terminal of the current detection amplifier 821. The other end of the detection resistor 823 is grounded. A non-inverting input terminal of the current amplifier 821 is grounded. An output terminal of the current detection amplifier 821 is connected to a control circuit (not shown). The control circuit controls a gate voltage of the transistors Tr 801–811 in accordance with an output voltage of the current detection amplifier 821.

More specifically, when the driving current Io varies and a voltage at the node C varies accordingly, the output voltage of the current detection amplifier 821 varies. When detecting that the driving current Io grows to an excess current, the control circuit (not shown) controls the current by controlling the gate voltage of the transistors Tr 801–811, in accordance with the output voltage of the current detection amplifier 821.

The driving current Io is controlled according to the related art in a procedure as described above. Employing a circuit construction as shown in FIG. 8, however, presents a problem in that the voltage generated across the detection resistor 823 is counted as a loss of the power supply voltage $V_M$.

One method to address the above problem is a current detection circuit in which one of two n-channel MOSFET transistors connected in parallel is used as an output transistor and the other is used as a detection transistor (see FIG. 1 of patent document No. 1). By using this current detection circuit, it is possible to eliminate a detection resistor from a path of a driving current connecting a power supply with a power ground.

[Patent document No. 1] Japanese Patent No. 2570523

There is a problem, however, in that, for proper operation of a current detection circuit, the resistance of a detection resistor should be low, and the low resistance causes the detection of voltage to become difficult. The patent document No. 1 proposes a current detection circuit (FIG. 3) in which the driving current is not diverted into a power unit and a detection unit. In order to operate this current detection circuit, however, it is necessary to provide a constant-current source for detection.

SUMMARY OF THE INVENTION

Accordingly, an object of the present invention in view of the above related art is to provide a load driving circuit in which it is ensured that a voltage range of a load voltage is extensive, and an inexpensive detection resistor characterized by low power consumption is used. Another and more specific object of the invention is to provide a load driving circuit adapted for driving of a motor in a portable appliance such as a notebook personal computer in which low voltage driving is required.

In order to achieve the object, a load driving circuit according to a first invention controlling a driving current for driving a load in accordance with a detection current detected in a detection resistor, comprises: a current supplying MOS transistor provided with a detection source splitting a drain current by a predetermined shunt ratio and outputting one of the split currents as the detection current, and with an output source for outputting the other split current as the driving current; and a current buffer circuit having its input terminals connected to the detection source and the output source, respectively, and supplying the detection current to the detection resistor from an output terminal.

Preferably, the current supplying MOS transistor is provided with a detection cell and an output cell, and the detection source outputs a current that flows in the detection cell as the detection current, and the output source outputs a current that flows in the output cell as the driving current.

The shunt ratio is in proportion to a cell ratio between the detection cell and the output cell.

Preferably, the load is a motor.

A load driving circuit according to a second invention controlling a driving current for driving a load in accordance with a detection current detected in a detection resistor, comprises: a current supplying MOS transistor provided with a detection drain splitting a source current by a predetermined shunt ratio and outputting one of the split currents as the detection current, and with an output drain for outputting the other split current as the driving current; and a current buffer circuit having its input terminals connected to the detection drain and the output drain, respectively, and supplying the detection current to the detection resistor from an output terminal.

Preferably, the current supplying MOS transistor is provided with a-detection cell and an output cell, and the detection drain outputs a current that flows in the detection cell as the detection current, and the output drain outputs a current that flows in the output cell as the driving current.

The shunt ratio is in proportion to a cell ratio between the detection cell and the output cell.

Preferably, the load is a motor.

According to the load driving circuit of the present invention, it is ensured that a voltage range of a load is extensive and an inexpensive detection resistor characterized by low power consumption can be used.

DETAILED DESCRIPTION OF THE INVENTION

Figure 1:
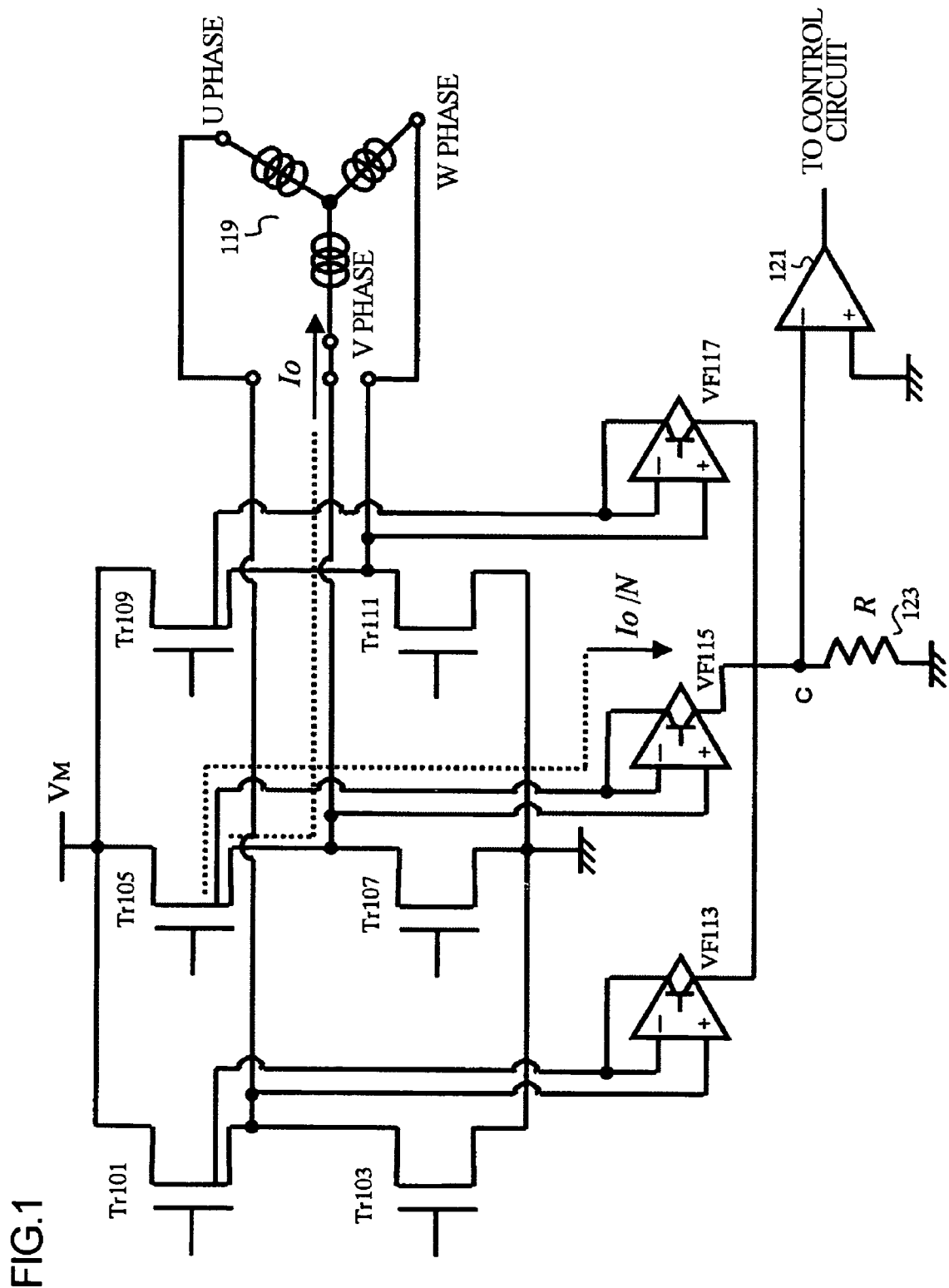
FIG. 1 is a block diagram of a load driving circuit according to first and second embodiments of the present invention.
Figure 2:
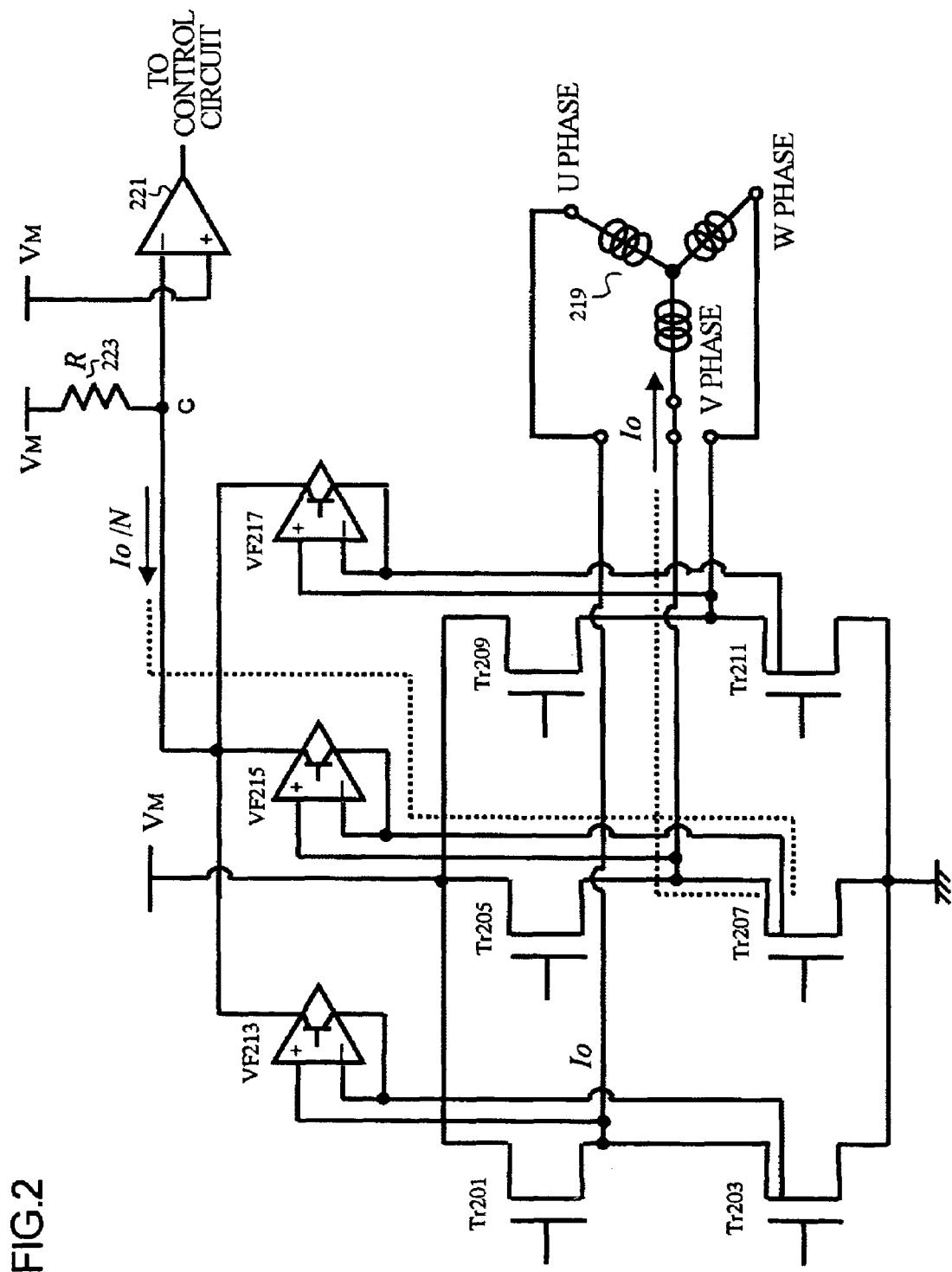
FIG. 2 is a block diagram of a load driving circuit according to a third embodiment of the present invention.

FIGS. 1 and 2 are block diagrams of load driving circuits according to embodiments of the present invention. FIGS. 3A–5B show circuit structures of transistors, current buffer circuits and detection resistors according to embodiments of the present invention. FIGS. 6A–7B are plan views of MOS transistors according to the embodiments of the present invention. A detailed description will now be given by referring to the attached drawings.

1. First Embodiment of the Present Invention 1-(1) Description of a Load Driving Circuit In this embodiment, transistors Tr (hereinafter, referred to as Tr) 101–111 are implemented by n-channel MOS transistors.

A description will be given of a load driving circuit according to the first embodiment of the present invention by referring to FIG. 1. The control circuit (not shown) drives a motor 119 by subjecting Tr 101–111 to on and off switching and by supplying, according to a predetermined pattern, a driving current Io to U-phase through W-phase current driving terminals constituting the motor 119.

Tr 101, Tr 105 and Tr 109 are connected with a motor power supply $V_M$ and arranged in parallel with each other, the drains of Tr being connected to the motor power supply $V_M$ and the gates thereof being connected to a control circuit (not shown). The sources of Tr are divided into output sources (S1) and detection sources (S2). A detailed description thereof will be given later.

Tr 103, Tr 107 and Tr 111 are connected in series with Tr 101, Tr 105 and Tr 109. The drain of Tr 103 is connected to the output source (S1) of Tr 101. The drain of Tr 107 is connected to the output source (S1) of Tr 105. The drain of Tr 111 is connected to the output source (S1) of Tr 109.

Nodes between the output sources (S1) of Tr 101–109 and the drains of Tr 103–111 are connected to the motor 119 so that a current that flows in Tr (driving current Io) is supplied to the motor 119. The gates of Tr 103, Tr 107 and Tr 111 are connected to the control circuit (not shown) and the sources thereof are grounded.

As mentioned before, the sources of Tr 101–109 are divided into output sources (S1) and detection sources (S2). The detection source (S2) of Tr 101 is connected to an inverting input terminal of a current buffer circuit (hereinafter, referred to as VF) 113, the detection source (S2) of Tr 105 is connected to an inverting input terminal of a VF 115, and the detection source (S2) of Tr 109 is connected to an inverting input terminal of a VF 117.

A non-inverting input terminal of VF 113 is connected to the output source (S1) of Tr 101, a non-inverting input terminal of VF 115 is connected to the output source (S1) of Tr 105, and a non-inverting input terminal of VF 117 is connected to the output source (S1) of Tr 109.

Output terminals of VF 113–117 are connected to a detection resistor 123, and a node C between the output terminals and the detection resistor 123 is connected to an inverting input terminal of a current detection amplifier 121. The other terminal of the detection resistor 123 is grounded. A non-inverting input terminal of the current detection amplifier 121 is also grounded. An output terminal of the current detection amplifier 121 is connected to the control circuit (not shown). The control circuit controls gate voltages of the transistors Tr 101–111 in accordance with an output voltage of the current detection amplifier 121.

In the case of the load driving circuit shown in FIG. 1, a detection current Is (=Io/N) which is 1/N in level of the driving current Io flows in the detection resistor 123, where N indicates a shunt ratio between a current (=driving current Io) that flows in the output source (S1) and a current (=detection current Is) that flows in the detection source (S2). The shunt ratio N is determined by a cell ratio between the output source (S1) and the detection source (S2). In this embodiment, N=100.

As described above, by employing the circuit structure shown in FIG. 1, the detection resistor 123 is eliminated from a path of the driving current connecting the motor power supply $V_M$ and the power ground. Accordingly, it is ensured that the voltage range of the motor power supply $V_M$ is extensive. Since the detection current Is is 1/N of the driving current Io, the impedance of the detection resistor 123 may be N times as large as that of the related art. Alternatively, the power consumption of the resistor may be $1/N^2$ of that of the related art.

For proper detection of a current, the shunt ratio between the detection current Is and the driving current Io should always be maintained to be N. For this purpose, this embodiment ensures that the current that flows in the output source (S1) and the current that flows in the detection source (S2) constitute a current mirror, and provides the current buffer circuits (VF 113, 115, 117) to maintain the mirror ratio.

1-(2) Description of the Transistor and the Current Buffer Circuit

Figure 3A:
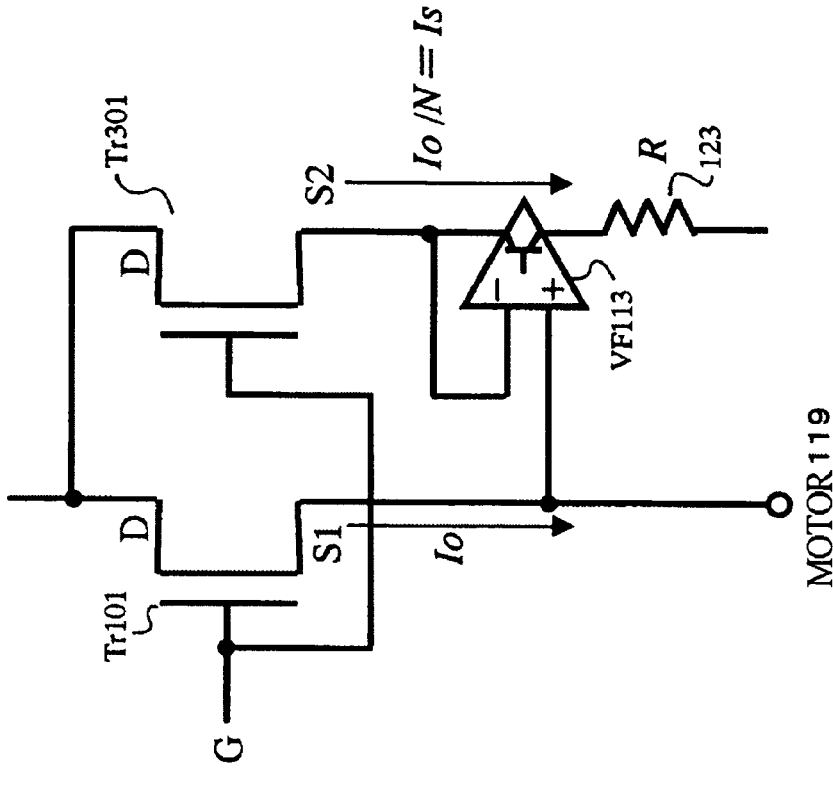
FIGS. 3A–3B show a circuit structure of a transistor and a current buffer circuit according to the first embodiment of the present invention.

FIG. 3A shows a circuit structure of the transistor, the current buffer circuit and the detection resistor according to this embodiment. The description that follows is directed to Tr 101, VF 113 and the detection resistor 123 of FIG. 1. However, the description also applies to Tr 105–109 and VF 115–117. In this embodiment, the current buffer circuits VF 113–117 are implemented by a combination of a differential amplifier circuit and a transistor. It will be obvious, however, there are alternative implementations.

As shown in FIG. 3A, Tr 101 has its source divided into the output source (S1) and the detection source (S2). The output source (S1) is connected to the non-inverting input terminal of VF 113 and the motor 119, and the detection source (S2) is connected to the inverting input terminal of VF 113. The output terminal of VF 113 is connected to the detection resistor 123 so as to supply the detection current Is to the detection resistor 123. The current buffer circuit is high in input impedance and low in output impedance so that a voltage gain is approximately 1. That is, the output voltage of VF 113 is almost equal to the voltage at the output source (S1).

Accordingly, a voltage ($V_{GS1}$) between the gate of Tr 101 and the output source (S1), a voltage ($V_{GS2}$) between the gate thereof and the detection source (S2) are equal to each other. Further, a voltage ($V_{DS1}$) between the drain of Tr 101 and the output source (S1) and a voltage ($V_{DS2}$) between the drain thereof and the detection source (S2) are equal to each other. By provision of VF 113, the detection current Is (=Io/N) commensurate with the shunt ratio N between the sources (S1, S2) is supplied to the detection resistor 123.

Figure 3B:
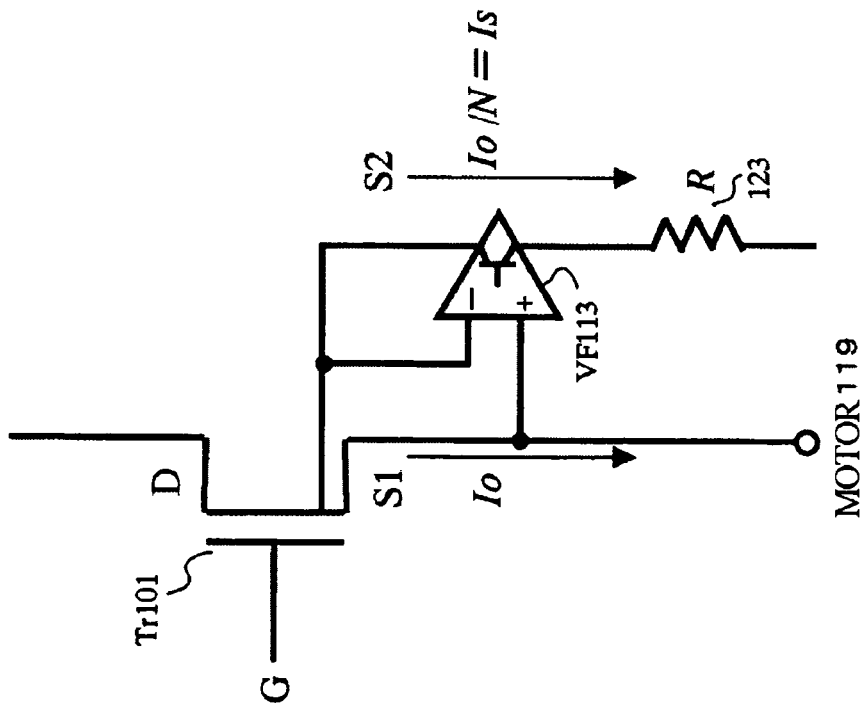

FIG. 3B shows an equivalent circuit of FIG. 3A.

Since the drains of Tr 301 and Tr 101 are connected to each, the drain voltages of these transistors are equal. Since the gates of Tr 301 and Tr 101 are connected to each other, the gate voltages of these transistors are equal.

Referring to FIG. 3B, the source (S1) of Tr 101 corresponds to the output source and the source (S2) of Tr 301 corresponds to the detection source. As mentioned before, in order to ensure that the shunt ratio between the output source (S1) and the detection source (S2) is always maintained to be N, Tr 101 and Tr 301 should constitute a current mirror circuit.

In order for Tr 101 and Tr 301 to constitute a current mirror circuit, the source voltages and the drain voltages of these transistors should be equal. This is why the source (S1) of Tr 101 is connected to the non-inverting input terminal of VF 113 and the motor 119, the source (S2) of Tr 301 is connected to the inverting input terminal of VF 113, and the output terminal of VF 113 is connected to the detection resistor 123. In this way, it is ensured that the source voltage of Tr 301 is equal to the source voltage of Tr 101. Further, by connecting the drain of Tr 101 to the drain of Tr 301, it is ensured that the drain voltage of Tr 101 is equal to the drain voltage of Tr 301.

1-(3) Description of the Shunt Ratio and the Cell Ratio

The top view of the n-channel MOS transistor according to the first embodiment will be explained by referring to FIG. 6A. The transistors Tr 101, 105 and 109 are illustrated as 601 in the figure. The cell 605 indicates the drain, the cell 607 indicates the source and the line 603 connecting the cell 605 and the cell 607 indicates the gate. It is assumed in this embodiment that there are on the order of 1000–10000 cells in total.

Since the detection cell S2 for detection of a current should be of high efficiency, cells, located at the center of temperature gradation in the transistors 601 and physically located near the center of the transistors 601, are used. Thus, in this embodiment, several tens of cells are selected from a cell group at the center of the transistors 601 and are used as the detection cells. The rest of the cells are used as the output cells.

As mentioned before, the cell ratio N of 100 is used in this embodiment. However, N can be altered as the case may be to adapt for the total number of cells or the configuration of the transistors.

Figure 6B:
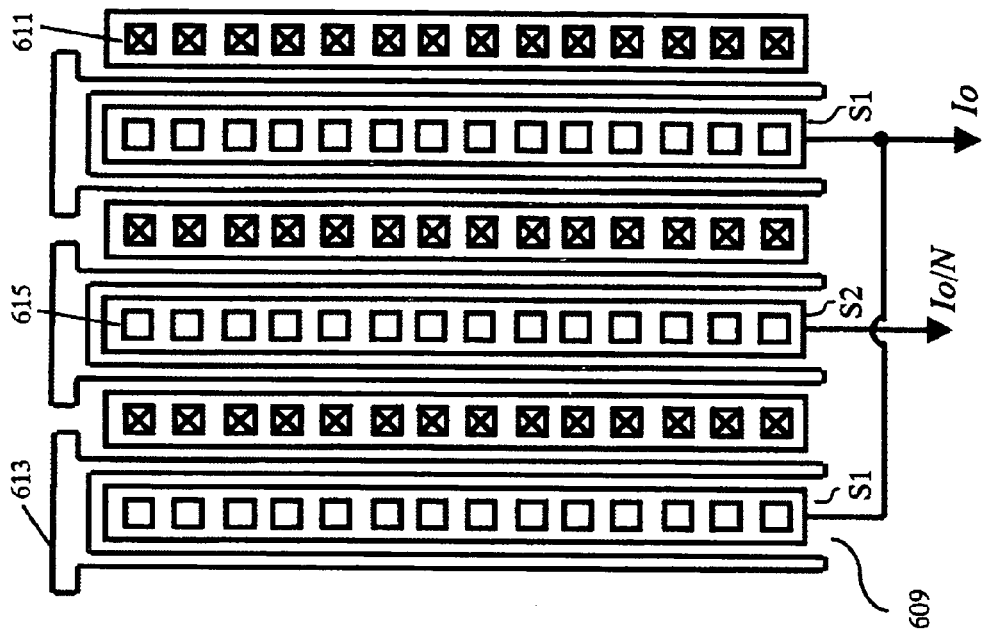
FIGS. 6A–6B are plan views of MOS transistors according to embodiments of the present invention.
Figure 6A:
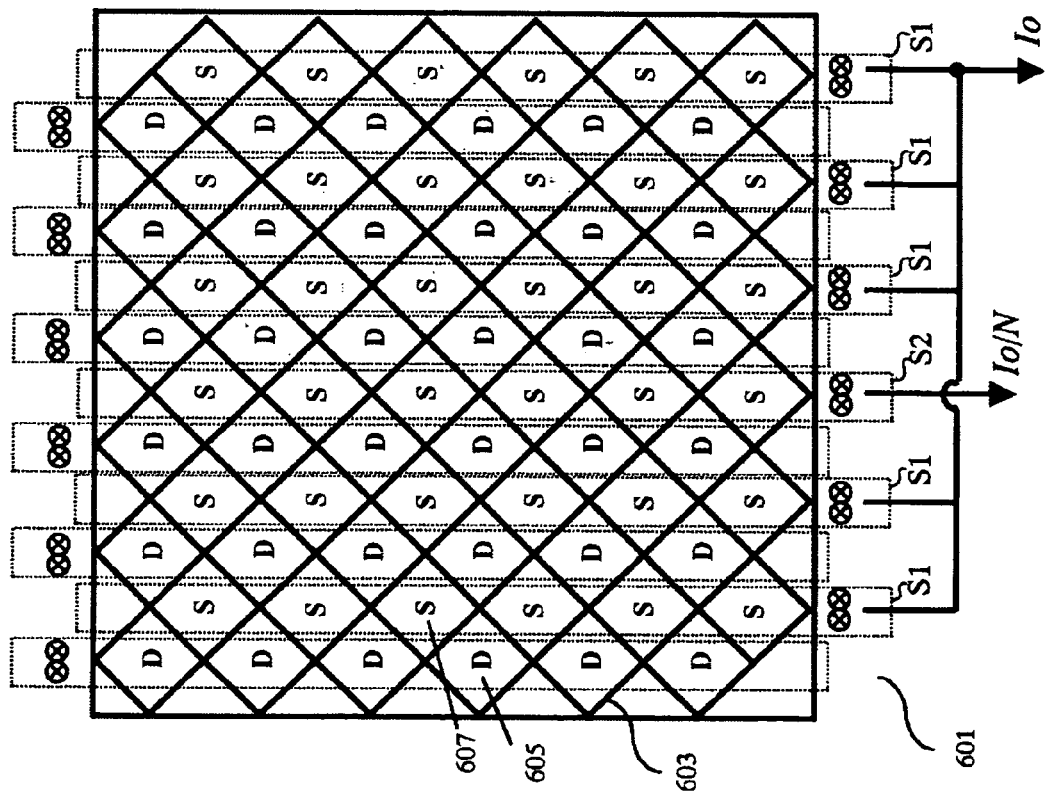

As shown in FIG. 6A, the driving current Io that flows in the output cell is output from the output source (S1) and the detection current Io/N that flows in the detection cell is output from the detection source (S2).

The top view of the n-channel MOS transistor according to a variation will be explained by referring to FIG. 6B. The transistors Tr 101, 105 and 109 are illustrated as 609 in the figure. The cell 611 indicates the drain, the cell 615 indicates the source, and the gate is illustrated as 613. It is assumed in this embodiment that there are on the order of 1000–10000 cells in total.

Since the detection cell S2 for detection of a current should be of high efficiency, cells, located at the center of temperature gradation in the transistors 609 and physically located near the center of the transistors 609, are used. Thus, in this embodiment, several tens of cells are selected from a cell group at the center of the transistors 609 and are used as the detection cells. The rest of the cells are used as the output cells.

As mentioned before, the cell ratio N of 100 is used in this embodiment. However, N can be altered as the case may be to adapt for the total number of cells or the configuration of the transistors.

As shown in FIG. 6B, the driving current Io that flows in the output cell is output from the output source (S1) and the detection current Io/N that flows in the detection cell is output from the detection source (S2).

2. Second Embodiment of the Present Invention 2-(1) Description of a Load Driving Circuit In this embodiment, transistors Tr (hereinafter, referred to as Tr) 101, 105 and 109 are implemented by p-channel MOS transistors, and Tr 103, 107 and 111 are implemented by n-channel MOS transistors.

A description will be given of a load driving circuit according to the second embodiment of the present invention by referring to FIG. 1. The control circuit (not shown) drives the motor 119 by subjecting Tr 101–111 to on and off switching and by supplying, according to a predetermined pattern, the driving current Io to U-phase through W-phase current driving terminals constituting the motor 119.

Tr 101, Tr 105 and Tr 109 are connected with the motor power supply $V_M$ and arranged in parallel with each other, the sources of Tr being connected to the motor power supply $V_M$ and the gates thereof being connected to the control circuit (not shown). The drains of Tr are divided into output drains (D1) and detection drains (D2). A detailed description thereof will be given later.

Tr 103, Tr 107 and Tr 111 are connected in series with Tr 101, Tr 105 and Tr 109. The source of Tr 103 is connected to the output drain (D1) of Tr 101. The source of Tr 107 is connected to the output drain (D1) of Tr 105. The source of Tr 111 is connected to the output drain (D1) of Tr 109.

Nodes between the output drains (D1) of Tr 101–109 and the sources of Tr 103–111 are connected to the motor 119 so that a current that flows in Tr (driving current Io) is supplied to the motor 119. The gates of Tr 103, Tr 107 and Tr 111 are connected to the control circuit (not shown) and the drains thereof are grounded.

As mentioned before, the drains of Tr 101–109 are divided into output drains (D1) and detection drains (D2). The detection drain (D2) of Tr 101 is connected to the inverting input terminal of the current buffer circuit (hereinafter, referred to as VF) 113, the detection drain (D2) of Tr 105 is connected to the inverting input terminal of VF 115, and the detection drain (D2) of Tr 109 is connected to the inverting input terminal of VF 117.

The non-inverting input terminal of VF 113 is connected to the output drain (D1) of Tr 101, the non-inverting input terminal of VF 115 is connected to the output drain (D1) of Tr 105, and the non-inverting input terminal of VF 117 is connected to the output drain (D1) of Tr 109.

The output terminals of VF 113–117 are connected to a detection resistor 123, and the node C between the output terminals and the detection resistor 123 is connected to the inverting input terminal of the current detection amplifier 121. The other terminal of the detection resistor 123 is grounded. The non-inverting input terminal of the current detection amplifier 121 is also grounded. The output terminal of the current detection amplifier 121 is connected to the control circuit (not shown). The control circuit controls the gate voltages of the transistors Tr 101–111 in accordance with the output voltage of the current detection amplifier 121.

In the case of the load driving circuit shown in FIG. 1, the detection current Is (=Io/N) which is 1/N in level of the driving current Io flows in the detection resistor 123, where N indicates the shunt ratio between the current (=driving current Io) that flows in the output drain (D1) and the current (=detection current Is) that flows in the detection drain (D2). The shunt ratio N is determined by a cell ratio between the output drain (D1) and the detection drain (D2). In this embodiment, N=100.

As described above, by employing the circuit structure shown in FIG. 1, the detection resistor 123 is eliminated from a path of the driving current connecting the motor power supply $V_M$ and the power ground. Accordingly, it is ensured that the voltage range of the motor power supply $V_M$ is extensive. Since the detection current Is is 1/N of the driving current Io, the impedance of the detection resistor 123 may be N times as large as that of the related art. Alternatively, the power consumption of the resistor may be $1/N^2$ of that of the related art.

For proper detection of a current, the shunt ratio between the detection current Is and the driving current Io should always be maintained to be N. For this purpose, this embodiment ensures that the current that flows in the output drain (D1) and the current that flows in the detection drain (D2) constitute a current mirror, and provides the current buffer circuits (VF 113, 115, 117) to maintain the mirror ratio.

2-(2) Description of the Transistor and the Current Buffer Circuit

Figure 4A:
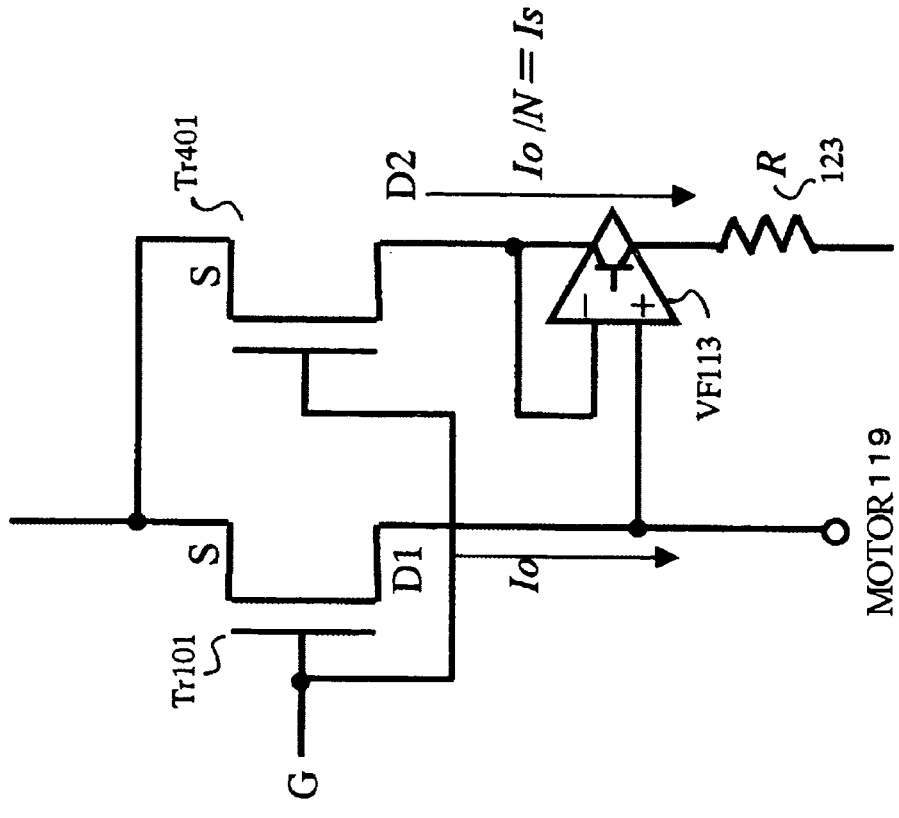
FIGS. 4A–4B show a circuit structure of a transistor and a current buffer circuit according to the second embodiment of the present invention.

FIG. 4A shows a circuit structure of the transistor, the current buffer circuit and the detection resistor according to this embodiment. The description that follows is directed to Tr 101, VF 113 and the detection resistor 123 of FIG. 1. However, the description also applies to Tr 105–109 and VF 115–117.

As shown in FIG. 4A, Tr 101 has its drain divided into the output drain (D1) and the detection drain (D2). The output drain (D1) is connected to the non-inverting input terminal of VF 113 and the motor 119, and the detection drain (D2) is connected to the inverting input terminal of VF 113. The output terminal of VF 113 is connected to the detection resistor 123 so as to supply the detection current Is to the detection resistor 123. The current buffer circuit is high in input impedance and low in output impedance so that a voltage gain is approximately 1. That is, the output voltage of VF 113 is almost equal to the voltage at the output drain (D1).

Accordingly, a voltage ($V_{SD1}$) between the source of Tr 101 and the output drain (D1), a voltage ($V_{SD2}$) between the source thereof and the detection drain (D2) are equal to each other. By provision of VF 113, the detection current Is (=Io/N) commensurate with the shunt ratio N between the drains (D1, D2) is supplied to the detection resistor 123.

Figure 4B:
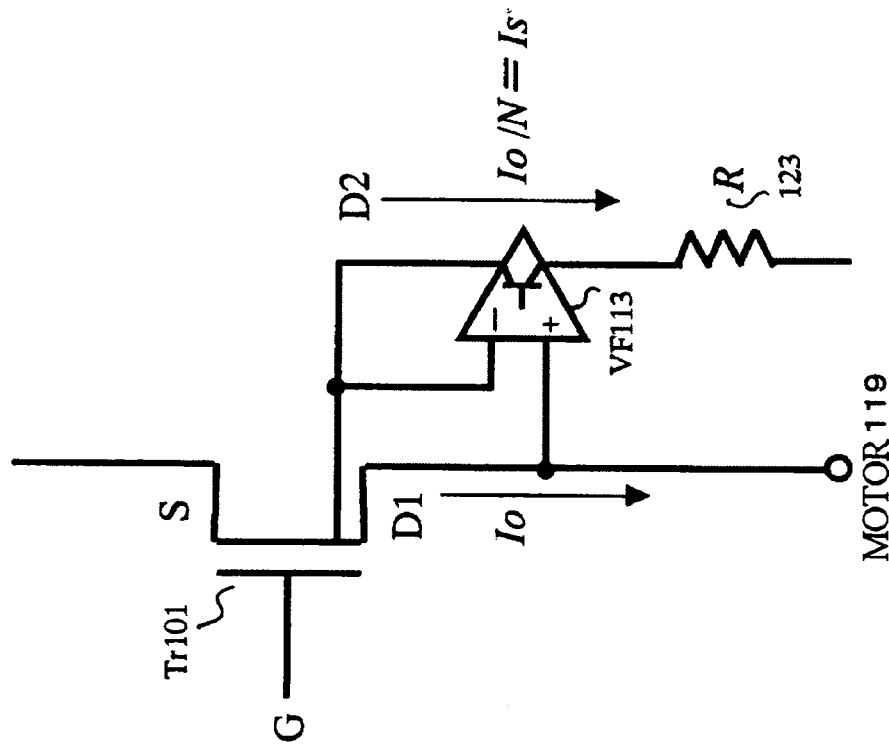

FIG. 4B shows an equivalent circuit of FIG. 4A.

Since the sources of Tr 401 and Tr 101 are connected to each, the source voltages of these transistors are equal. Since the gates of Tr 401 and Tr 101 are connected to each other, the gate voltages of these transistors are equal.

Referring to FIG. 4B, the drain (D1) of Tr 101 corresponds to the output drain and the drain (D2) of Tr 401 corresponds to the detection drain. As mentioned before, in order to ensure that the shunt ratio between the output drain (D1) and the detection drain (D2) is always maintained to be N, Tr 101 and Tr 401 should constitute a current mirror circuit.

In order for Tr 101 and Tr 401 to constitute a current mirror circuit, the drain voltages of these transistors should be equal. This is why the drain (D1) of Tr 101 is connected to the non-inverting input terminal of VF 113 and the motor 119, the drain (D2) of Tr 401 is connected to the inverting input terminal of VF 113, and the output terminal of VF 113 is connected to the detection resistor 123. In this way, it is ensured that the drain voltage of Tr 401 is equal to the drain voltage of Tr 101.

2-(3) Description of the Shunt Ratio and the Cell Ratio

The top view of the p-channel MOS transistor according to this embodiment will be explained by referring to FIG. 7A. The transistors Tr 101, 105 and 109 are illustrated as 701 in the figure. The cell 705 indicates the drain, the cell 707 indicates the source and the line 703 connecting the cell 705 and the cell 707 indicates the gate. It is assumed in this embodiment that there are on the order of 1000–10000 cells in total.

Since the detection cell D2 for detection of a current should be of high efficiency, cells, located at the center of temperature gradation in the transistors 701 and physically located near the center of the transistors 701, are used. Thus, in this embodiment, several tens of cells are selected from a cell group at the center of the transistors 701 and used as the detection cells. The rest of the cells are used as the output cells.

As mentioned before, the cell ratio N of 100 is used in this embodiment. However, N can be altered as the case may be to adapt for the total number of cells or the configuration of the transistors.

Figures 7A, 7B:
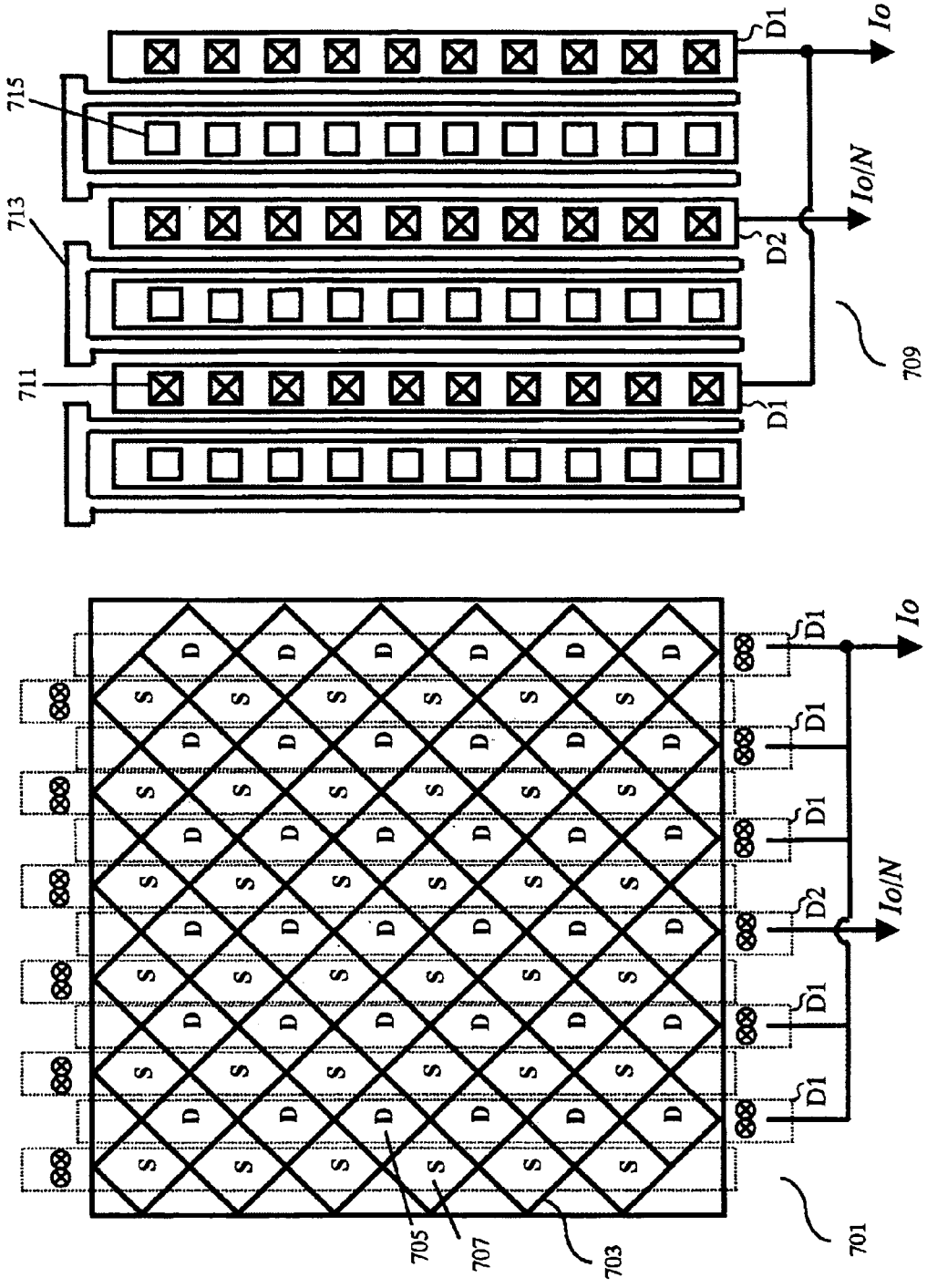
FIGS. 7A–7B are plan views of MOS transistors according to embodiments of the present invention.
Figure 8:
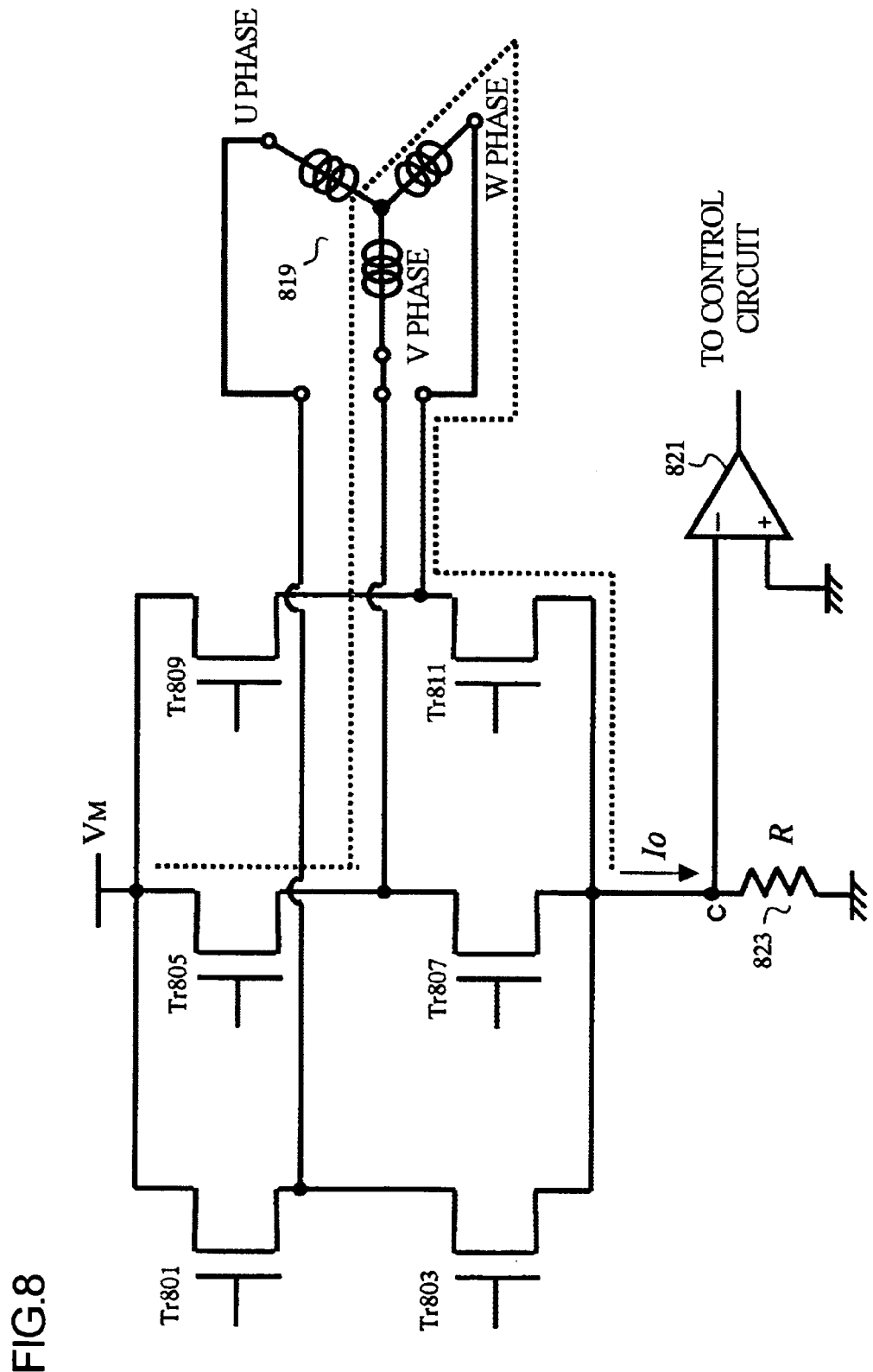
FIG. 8 is a block diagram of a load driving circuit according to the related art.

As shown in FIG. 7A, the driving current Io that flows in the output cell is output from the output drain (D1) and the detection current Io/N that flows in the detection cell is output from the detection drain (D2).

The top view of the p-channel MOS transistor according to a variation will be explained by referring to FIG. 7B. The transistors Tr 101, 105 and 109 are illustrated as 709 in the figure. The cell 711 indicates the drain, the cell 715 indicates the source, and the gate is illustrated as 713. It is assumed in this embodiment that there are on the order of 1000–10000 cells in total.

Since the detection cell D2 for detection of a current should be of high efficiency, cells, located at the center of temperature gradation in the transistors 709 and physically located near the center of the transistors 709, are used. Thus, in this embodiment, several tens of cells are selected from a cell group at the center of the transistors 709 and are used as the detection cells. The rest of the cells are used as the output cells.

As mentioned before, the cell ratio N of 100 is used in this embodiment. However, N can be altered as the case may be to adapt for the total number of cells or the configuration of the transistors.

As shown in FIG. 7B, the driving current Io that flows in the output cell is output from the output drain (D1) and the detection current Io/N that flows in the detection cell is output from the detection drain (D2).

3. Third Embodiment of the Present Invention 3-(1) Description of a Load Driving Circuit In this embodiment, transistors Tr (hereinafter, referred to as Tr) 201–211 are implemented by n-channel MOS transistors.

A description will be given of a load driving circuit according to the third embodiment of the present invention by referring to FIG. 2. The control circuit (not shown) drives the motor 219 by subjecting Tr 201–211 to on and off switching and by supplying, according to a predetermined pattern, the driving current Io to U-phase through W-phase current driving terminals constituting the motor 219.

Tr 201, Tr 205 and Tr 209 are connected with a motor power supply V$_M$ and arranged in parallel with each other, the drains of Tr being connected to the motor power supply V$_M$ and the gates thereof being connected to a control circuit (not shown). The source of Tr 201 is connected to the output drain (D1) of Tr 203. The source of Tr 205 is connected to the output drain (D1) of Tr 207. The source of Tr 209 is connected to the output drain (D1) of Tr 211.

The drains of Tr 203, Tr 207 and Tr 211 are divided into output drains (D1) and detection drains (D2). A detailed description thereof will be given later.

Nodes between the output drains (D1) of Tr 203–211 and the sources of Tr 201–209 are connected to the motor 219 so that a current that flows in Tr (driving current Io) is supplied to the motor 219. The gates of Tr 203, Tr 207 and Tr 211 are connected to the control circuit (not shown) and the sources thereof are grounded.

As mentioned before, the drains of Tr 203–211 are divided into output drains (D1) and detection drains (D2). The detection drain (D2) of Tr 203 is connected to the inverting input terminal of the current buffer circuit (hereinafter, referred to as VF) 213, the detection drain (D2) of Tr 207 is connected to the inverting input terminal of VF 215, and the detection drain (D2) of Tr 211 is connected to the inverting input terminal of VF 217.

The non-inverting input terminal of VF 213 is connected to the output drain (D1) of Tr 203, the non-inverting input terminal of VF 215 is connected to the output drain (D1) of Tr 207, and the non-inverting input terminal of VF 217 is connected to the output drain (D1) of Tr 211.

The output terminals of VF 213–217 are connected to a detection resistor 223, and the node C between the output terminals and the detection resistor 223 is connected to the inverting input terminal of the current detection amplifier 221. The other terminal of the detection resistor 223 is grounded. The non-inverting input terminal of the current detection amplifier 221 is also grounded. The output terminal of the current detection amplifier 221 is connected to the control circuit (not shown). The control circuit controls the gate voltages of the transistors Tr 201–211 in accordance with the output voltage of the current detection amplifier 221.

In the case of the load driving circuit shown in FIG. 2, the detection current Is (=Io/N) which is 1/N in level of the driving current Io flows in the detection resistor 223, where N indicates the shunt ratio between the current (=driving current Io) that flows in the output drain (D1) and the current (=detection current Is) that flows in the detection drain (D2). The shunt ratio N is determined by a cell ratio between the output drain (D1) and the detection drain (D2). In this embodiment, N=100.

As described above, by employing the circuit structure shown in FIG. 2, the detection resistor 223 is eliminated from a path of the driving current connecting the motor power supply V$_M$ and the power ground. Accordingly, it is ensured that the voltage range of the motor power supply V$_M$ is extensive. Since the detection current Is is 1/N of the driving current Io, the impedance of the detection resistor 223 may be N times as large as that of the related art. Alternatively, the power consumption of the resistor may be 1/N$^2$ of that of the related art.

For proper detection of a current, the shunt ratio between the detection current Is and the driving current Io should always be maintained to be N. For this purpose, this embodiment ensures that the current that flows in the output drain (D1) and the current that flows in the detection drain (D2) constitute a current mirror, and provides the current buffer circuits (VF 213, 215, 217) to maintain the mirror ratio.

3-(2) Description of the Transistor and the Current Buffer Circuit

Figure 5A:
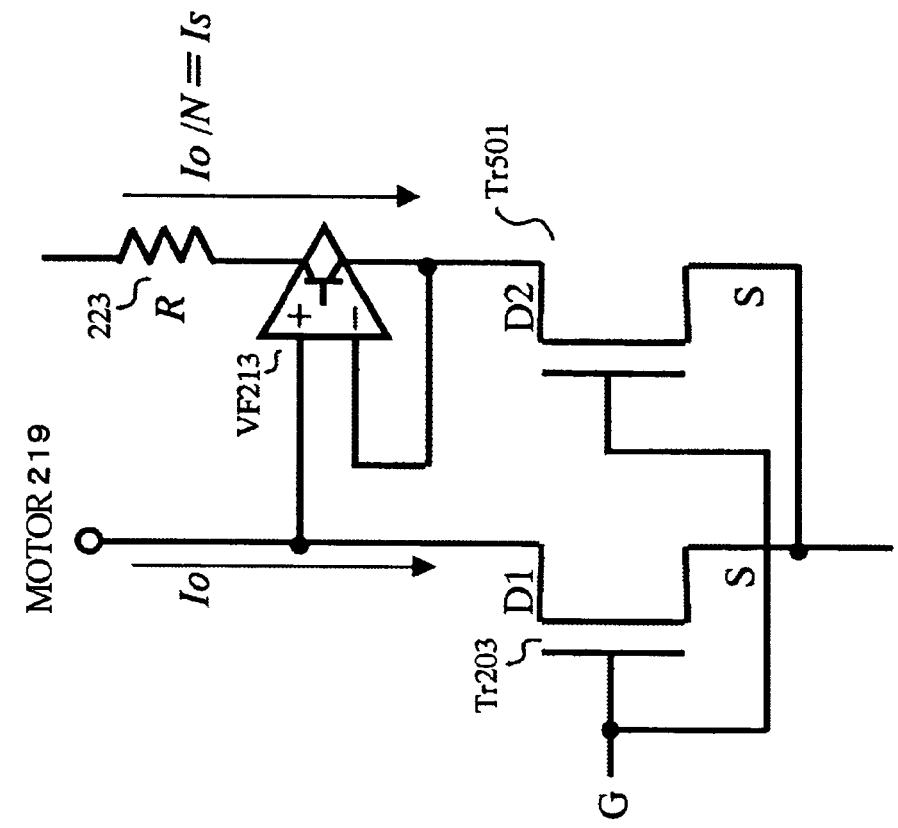
FIGS. 5A–5B show a circuit structure of a transistor and a current buffer circuit according to a third embodiment of the present invention.

FIG. 5A shows a circuit structure of the transistor, the current buffer circuit and the detection resistor according to this embodiment. The description that follows is directed to Tr 203, VF 213 and the detection resistor 223 of FIG. 2. However, the description also applies to Tr 205–209 and VF 215–217. In this embodiment, the current buffer circuits VF 213–217 are implemented by a combination of a differential amplifier and a transistor. It will be obvious, however, there are alternative implementations.

As shown in FIG. 5A, Tr 203 has its drain divided into the output drain (D1) and the detection drain (D2). The output drain (D1) is connected to the non-inverting input terminal of VF 213 and the motor 219, and the detection drain (D2) is connected to the inverting input terminal of VF 213. The output terminal of VF 213 is connected to the detection resistor 223 so as to supply the detection current Is to the detection resistor 223. The current buffer circuit is high in input impedance and low in output impedance so that a voltage gain is approximately 1. That is, the output voltage of VF 213 is almost equal to the voltage at the output drain (D1).

Accordingly, a voltage (V$_{D1S}$) between the output drain (D1) of Tr 203 and the source, a voltage (V$_{D2S}$) between the detection drain (D2) thereof and the source are equal to each other. By provision of VF 213, the detection current Is (=Io/N) commensurate with the shunt ratio N between the drains (D1, D2) is supplied to the detection resistor 223.

Figure 5B:
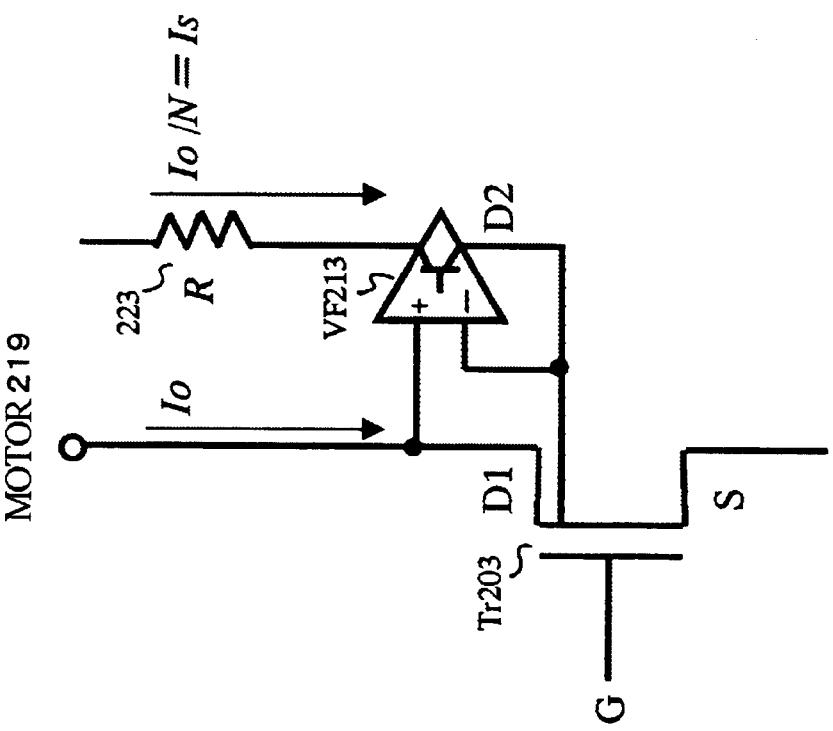

FIG. 5B shows an equivalent circuit of FIG. 5A.

Since the sources of Tr 501 and Tr 203 are connected to each, the source voltages of these transistors are equal. Since the gates of Tr 501 and Tr 203 are connected to each other, the gate voltages of these transistors are equal.

Referring to FIG. 5B, the drain (D1) of Tr 203 corresponds to the output drain and the drain (D2) of Tr 501 corresponds to the detection drain. As mentioned before, in order to ensure that the shunt ratio between the output drain (D1) and the detection drain (D2) is always maintained to be N, Tr 203 and Tr 501 should constitute a current mirror circuit.

In order for Tr 203 and Tr 501 to constitute a current mirror circuit, the drain voltages of these transistors should be equal. This is why the drain (D1) of Tr 203 is connected to the non-inverting input terminal of VF 213 and the motor 219, the drain (D2) of Tr 501 is connected to the inverting input terminal of VF 213, and the output terminal of VF 213 is connected to the detection resistor 223. In this way, it is ensured that the drain voltage of Tr 501 is equal to the drain voltage of Tr 203.

3-(3) Description of the Shunt Ratio and the Cell Ratio

The top view of the n-channel MOS transistor according to this embodiment will be explained by referring to FIG. 7A. The transistors Tr 203, 207 and 211 are illustrated as 701 in the figure. The cell 705 indicates the drain, the cell 707 indicates the source and the line 703 connecting the cell 705 and the cell 707 indicates the gate. It is assumed in this embodiment that there are on the order of 1000–10000 cells in total.

Since the detection cell D2 for detection of a current should be of high efficiency, cells, located at the center of temperature gradation in the transistors 701 and physically located near the center of the transistors 701, are used. Thus, in this embodiment, several tens of cells are selected from a cell group at the center of the transistors 701 and used as the detection cells. The rest of the cells are used as the output cells.

As mentioned before, the cell ratio N of 100 is used in this embodiment. However, N can be altered as the case may be to adapt for the total number of cells or the configuration of the transistors.

As shown in FIG. 7A, the driving current Io that flows in the output cell is output from the output drain (D1) and the detection current Io/N that flows in the detection cell is output from the detection drain (D2).

The top view of the n-channel MOS transistor according to this embodiment will be explained by referring to FIG. 7B. The transistors Tr 203, 207 and 211 are illustrated as 709 in the figure. The cell 711 indicates the drain, the cell 715 indicates the source, and the gate is illustrated as 713. It is assumed in this embodiment that there are on the order of 1000–10000 cells in total.

Since the detection cell D2 for detection of a current should be of high efficiency, cells, located at the center of temperature gradation in the transistors 709 and physically located near the center of the transistors 709, are used. Thus, in this embodiment, several tens of cells are selected from a cell group at the center of the transistors 709 and used as the detection cells. The rest of the cells are used as the output cells.

As mentioned before, the cell ratio N of 100 is used in this embodiment. However, N can be altered as the case may be to adapt for the total number of cells or the configuration of the transistors.

As shown in FIG. 7B, the driving current Io that flows in the output cell is output from the output drain (D1) and the detection current Io/N that flows in the detection cell is output from the detection drain (D2).

Given above is a detailed description of the first through third embodiments of the present invention. In any of the embodiments, the present invention makes it possible to increase the resistance of the detection resistor N times as compared to the related art. For example, given that the related-art resistance is 0.2Ω–0.5Ω, the resistance may be 20Ω–50Ω according to the invention.

Alternatively, the power consumption of detection resistor according to the invention may be $P=(Io/N)^2(NR)=Io^2R/N$ instead of $P=Io^2R$ according to the related art. That is, the power consumption could be 1/N (for example, 1/100) that of the related art.

The load driven by the load driving circuit according to the present invention may be motors other than three-phase motors.

Further, application of the present invention is not limited to the above-described embodiments but could be extended to improvements and modifications thereof without departing from the scope of the present invention.

The present invention is suitably used in a load driving circuit for driving a low-voltage motor provided in a notebook personal computer or the like, or in driving circuits driving a variety of other loads.

What is claimed is:

1. A load driving circuit controlling a driving current for driving a load in accordance with a detection current detected in a detection resistor, comprising:

a current supplying MOS transistor provided with a detection source splitting a drain current by a predetermined shunt ratio and outputting one of the split currents as the detection current, and with an output source for outputting the other split current as the driving current; and a current buffer circuit having its input terminals connected to the detection source and the output source, respectively, and supplying the detection current to the detection resistor from an output terminal, wherein the current buffer circuit includes a differential amplifier circuit which operates so that a voltage at the detection source and a voltage at the output source match by feedback control.

2. The load driving circuit according to claim 1, wherein said current supplying MOS transistor is provided with a detection cell and an output cell, and the detection source outputs a current that flows in the detection cell as the detection current, and the output source outputs a current that flows in the output cell as the driving current.

3. The load driving circuit according to claim 1, wherein the shunt ratio is in proportion to a cell ratio between the detection source and the output source.

4. The load driving circuit according to claim 1, wherein the load is a motor.

5. A load driving circuit controlling a driving current for driving a load in accordance with a detection current detected in a detection resistor, comprising:

a current supplying MOS transistor provided with a detection drain splitting a source current by a predetermined shunt ratio and outputting one of the split currents as the detection current, and with an output drain for outputting the other split current as the driving current; and a current buffer circuit having its input terminals connected to the detection drain and the output drain, respectively, and supplying the detection current to the detection resistor from an output terminal, wherein the current buffer circuit includes a differential amplifier circuit which operates so that a voltage at the detection source and a voltage at the output source match by feedback control.

6. The load driving circuit according to claim 5, wherein said current supplying MOS transistor is provided with a detection cell and an output cell, and the detection drain outputs a current that flows in the detection cell as the detection current, and the output drain outputs a current that flows in the output cell as the driving current.

7. The load driving circuit according to claim 5, wherein the shunt ratio is in proportion to a cell ratio between the detection drain and the output drain.

8. The load driving circuit according to claim 5, wherein the load is a motor.

* * * * *